Patented Dec. 31, 1929

1,741,724

UNITED STATES PATENT OFFICE

MARY EDITH LOWER, OF WILLIAMSBURG, PENNSYLVANIA

PROCESS OF CANNING CORN

No Drawing.     Application filed April 15, 1927.   Serial No. 184,183.

This invention relates to a process of canning corn and has for its principal objects to improve the quality of the product by retaining a greater proportion of the natural corn flavor than has been possible by prior processes, and to eliminate the iron sulphide commonly found in canned corn manufactured by old methods.

Heretofore it has always been considered impossible to satisfactorily can corn in milk because under the application of heat sufficient to cook and sterilize the product the milk was invariably browned. I have found that by subjecting the corn to a preliminary steaming operation before the milk is added, the degree of heat and length of time necessary for sterilizing after the milk has been added and the cans sealed can be so reduced that browning of the milk does not occur. I have also found that corn subjected to this preliminary steaming operation does not curdle the milk, as does corn which has been heated almost to the boiling point in a brine, according to the methods heretofore practiced.

My improved process will now be described in detail, and the essential steps thereof will be pointed out in the subjoined claims.

The corn is blanched in steam, for example in a double boiler, then chilled by dashing cold water over it or playing a current of cold air through it. It is then cut from the cob in any desired manner and placed in the cans. The cans are nearly filled with milk, preferably in hot condition, care being taken not to fill them so full that they will be bursted during the subsequent sterilizing operation. The milk should be seasoned with butter and salt. The cans are next sealed and placed in the sterilizer. During the sterilizing operation great care must be taken to prevent browning of the milk. The heat and time required for sterilization are considerably reduced by the preliminary steaming operation. The steam will be too dry and hot if more than 100 pounds pressure is carried in the boiler. The pressure in the sterilizing vat should be not more than 15 pounds and the time of sterilization should be approximately 30 to 45 minutes. Great care should be taken to prevent the incoming steam from striking the cans directly. It is also desirable to keep the cans rolling. When the sterilization is complete the cans are quickly cooled to prevent re-cooking with consequent browning of the milk.

Corn canned in accordance with the process above set forth is superior to any other with which I am familiar, being in puffed up crisp condition and characterized by a natural corn flavor.

I have also found my product to be free from iron sulphide which commonly occurs in canned corn. This result I ascribe to the action of the milk which I believe forms a complete coating over the inner surface of the can, thereby preventing the sulphur in the corn from acting upon the iron of the can. It is my belief that this coating is formed by the casein in the milk.

Having described my invention, I claim:

1. A process of canning corn which consists in first steaming the corn until cooked, then placing the corn and a suitable quantity of milk in a can, and finally sterilizing the same by heat at a temperature and for a length of time such that browning of the milk does not occur.

2. A process of canning corn which consists in steaming the corn until cooked, thereafter chilling the corn, placing the corn and a suitable quantity of milk in a can, and sterilizing the same by heat at a temperature and for a length of time such that browning of the milk does not occur.

3. A process of canning corn which consists in steaming the corn until cooked, placing the corn and a suitable quantity of hot milk in a can, and sterilizing the same by heat at a temperature and for a length of time such that browning of the milk does not occur.

4. A process of canning corn which consists in steaming the corn until cooked, placing the corn and a suitable quantity of milk in a can, sterilizing the same by heat at a temperature and for a length of time such that browning of the milk does not occur, and thereafter rapidly cooling the same to prevent re-cooking.

5. A sterile canned product consisting of corn and milk, characterized by freedom from brown discoloration of the milk.

6. A sterile canned product consisting of corn and milk, characterized by freedom from iron sulphide discoloration.

The foregoing specification signed at Williamsburg, Pa., this 15 day of March, 1927.

M. EDITH LOWER.